Feb. 22, 1944.　　　　　G. FROVA　　　　　2,342,535
VEHICLE DRIVEN PONTOON
Filed April 7, 1942　　　　4 Sheets-Sheet 1
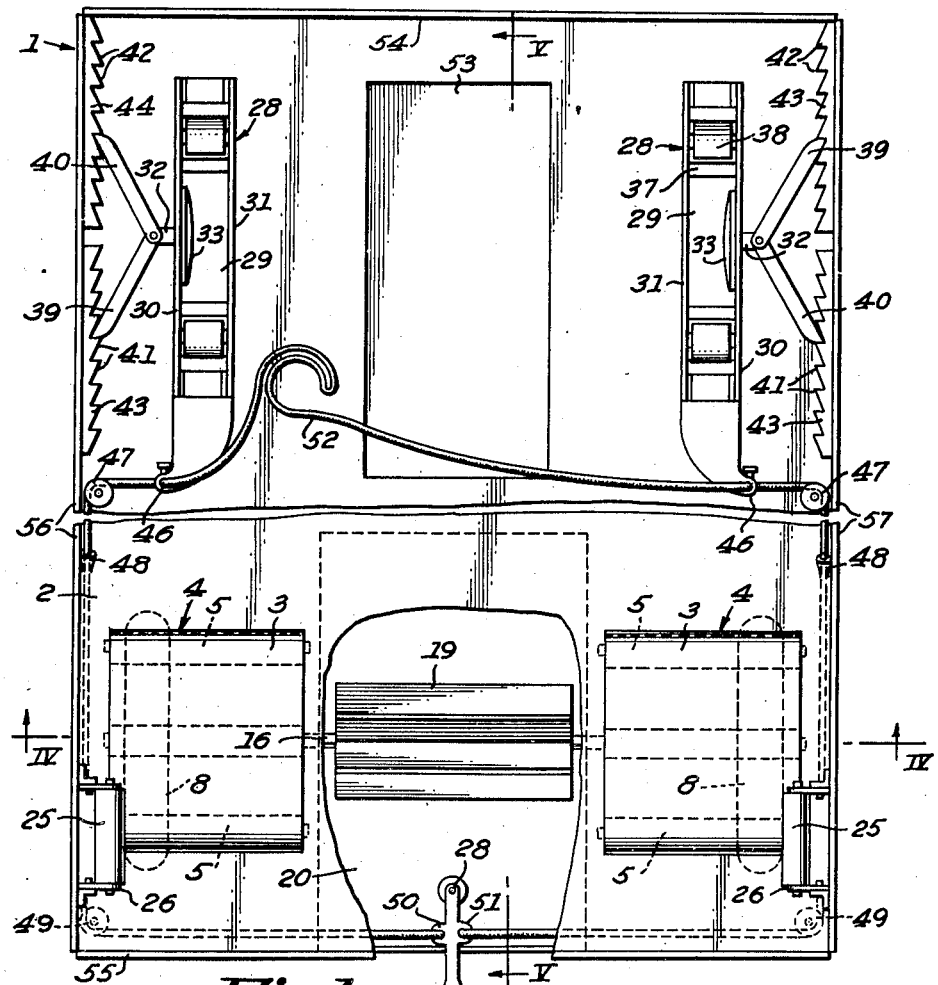
Fig. 1
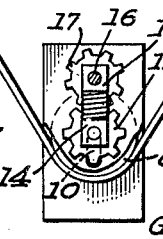
Fig. 6　　　Fig. 7
Inventor:
GIOVANNI FROVA
By Haseltine Lake & Co.
Attorneys.

Feb. 22, 1944.    G. FROVA    2,342,535
VEHICLE DRIVEN PONTOON
Filed April 7, 1942    4 Sheets-Sheet 2

Inventor:
GIOVANNI FROVA
By Haseltine, Lake & Co.
Attorneys.

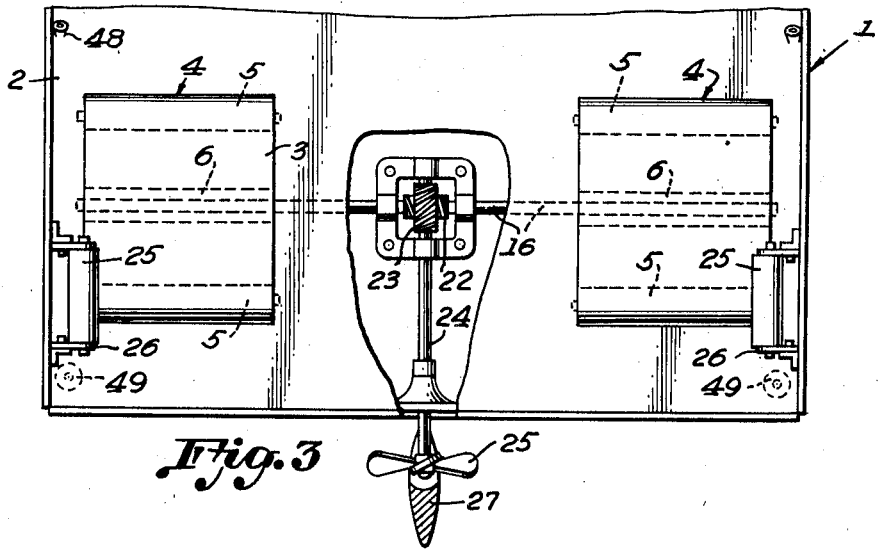
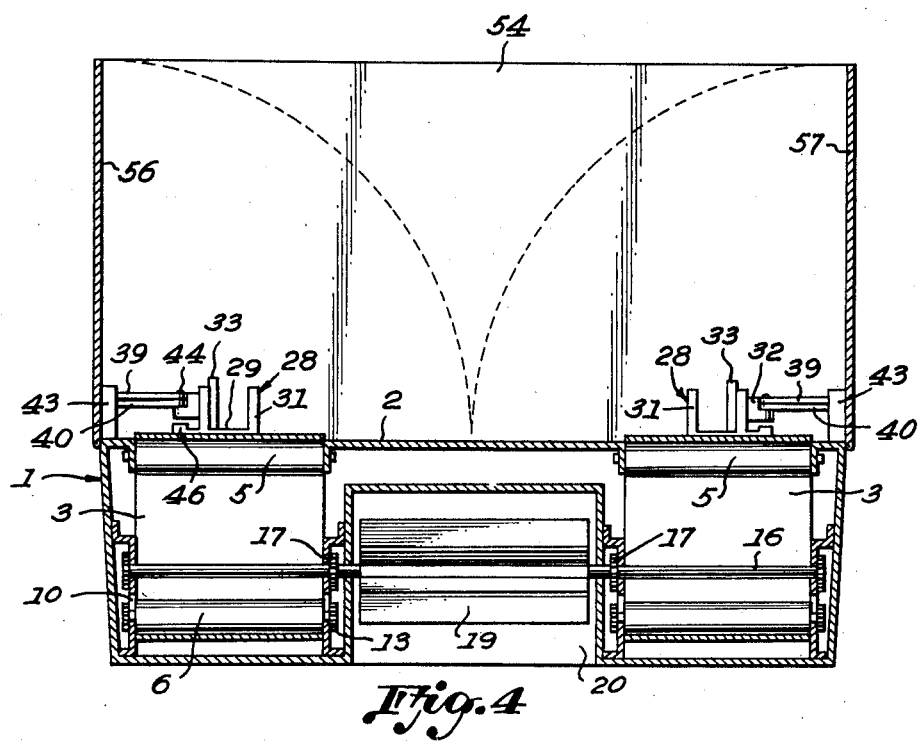

Feb. 22, 1944.  G. FROVA  2,342,535
VEHICLE DRIVEN PONTOON
Filed April 7, 1942  4 Sheets-Sheet 4

Inventor:
GIOVANNI FROVA
By Haseltine, Lake & Co.
Attorneys.

Patented Feb. 22, 1944

2,342,535

UNITED STATES PATENT OFFICE 2,342,535

VEHICLE DRIVEN PONTOON

Giovanni Frova, Jackson Heights, N. Y.

Application April 7, 1942, Serial No. 437,931

8 Claims. (Cl. 115—0.5)

This invention relates to vehicle-driven pontoons, or pontoons and water skis having propulsion means and steering or rudder means capable of operation by and from an automobile when in place on such a pontoon.

The main object of my invention is to make it readily possible to assemble pontoons suitable for building pontoon bridges in such a swift manner that such a bridge will be successfully constructed despite enemy gunfire and that practically immedate use may be made of the bridge after beginning its construction.

Another object is to equip such pontoons with propulsion means as well as steering means operated by the driver of an automobile or army truck merely by his remaining on the truck and driving the pontoon from his seat on said truck.

A further object is to provide such a pontoon with a drive means connected to a propeller or paddle wheels which can be driven by the rear wheels of an army truck when resting on exposed portions of said drive means.

It is also an object to equip pontoons and water skis with such drive and propulsion means as indicated and with appropriate means engaging with the front wheels of the automobile or truck connected to a rudder or other steering means that it is possible to use such pontoons singly as a ferry means for transporting loaded vehicles across rivers, along canals and other smaller bodies of water.

It should be mentioned that it is an important object of the invention to provide simple adjusting means for the steering gear which allows the use of the pontoons and water skis with various sizes of automobiles and trucks.

Other objects and the many advantages inherent in my invention and obtained by its use in peace and war will appear more fully in detail as this specification proceeds.

In order to disclose more comprehensively the features of the invention and its construction as well as certain details and modifications, it is illustrated in the accompanying drawings forming part hereof, and in which, Fig. 1 is a top plan view of a pontoon equipped with apparatus according to the invention in a practical form for propelling the pontoon by means of a paddle wheel.

Fig. 3 is another modification showing how the propeller of known type may be driven in similar fashion by a vehicle.

Fig. 4 is a transverse section of the pontoon as taken on line IV—IV in Fig. 1.

Fig. 6 is an enlarged diagrammatical view partly in section of the drive adapted to be driven by a rear wheel of an automobile or truck, certain parts being omitted for clarity and the drive means being shown in idle position.

Fig. 7 is a similar view of the same in active operating position with part of a drive wheel of an automobile indicated as being in place upon said drive means.

Throughout the views the same reference numerals indicate the same or like parts.

Figure 2:
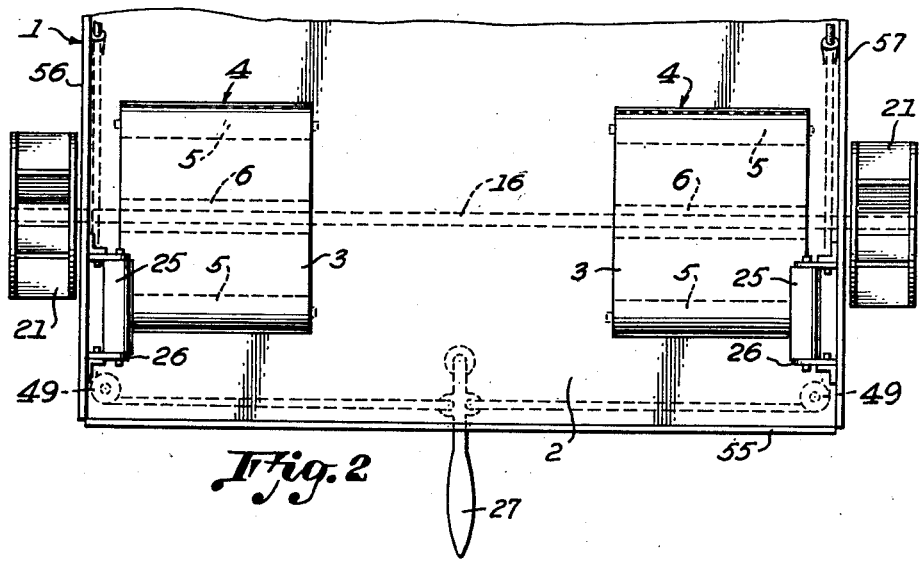
Fig. 2 is a fragmentary plan view of a modification of the same showing how the pontoon may be propelled by a pair of exterior side paddle wheels of conventional type adapted to be driven by a vehicle on said pontoon.
Figure 5:
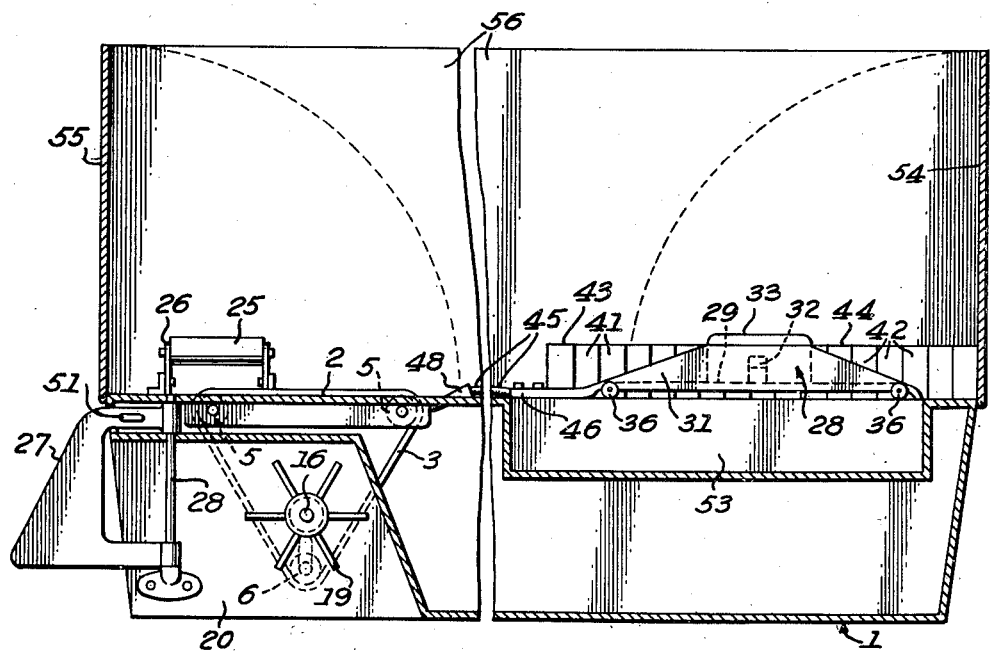
Fig. 5 is a longitudinal section taken on line V—V in the same Figure 1.

It is well known that in military campaigns pontoons have often been used to build temporary bridges for the purpose of crossing rivers, streams and lakes, such pontoons having been of various constructions and designs, but having always been towed into position by boats or external means. In the midst of a battle such pontoons have heretofore hardly been available for building such bridges, as the seamen, soldiers or workmen shifting the same into position and fastening them together have been so seriously exposed that the work could not proceed, not to mention that building such a pontoon bridge has also been rather slow work. Thus the low speed of building the pontoon bridge has sometimes defeated its own purpose.

It is now proposed to construct pontoons, water skis and the like in such proportions and with such equipment built into the same that it will be possible to run an automobile or truck, or even a motorcycle or a tank upon the same and then cause said pontoon to be driven by the vehicle carried thereon clear across the stream or body of water to be crossed and deposited upon the far shore, and then to be immediately added to or used for a pontoon bridge. On the other hand, it will be equally possible to propel the pontoon thus equipped into position to form a link in a pontoon bridge and as soon as the pontoon has been secured in place to run off the vehicle to the far shore over whatever part of the bridge has already been built.

Hence, in the practice of my invention a conventional pontoon generally indicated at 1, having a level deck 2 is provided with a pair of drive belts, chains or the like 3—3 at its rear portion which form a visible contact portion of a propulsion drive generally indicated at 4 preferably consisting of the mentioned belt 3, which lies slightly above the level of the deck 2 and is carried by a pair of parallel rollers 5—5 in each case, while a third roller 6 is mounted to be operated in a pending portion 7 of the belt for a purpose which will immediately appear. Normally the belt 3 of one of the drives is parallel with the surface of the deck 2, but when a vehicle is driven upon the pontoon and comes to rest with its rear wheels in position, as indicated in broken lines 8—8 in Figure 1, and is also indicated in Figure 7, the erstwhile horizontal portion of the belt is arched downwardly to conform to the shape of the wheel tire at 9 between rollers 5—5 so that the wheel virtually rests upon said rollers and obtains a positive friction grip upon the belt 3. It is quite evident that this belt might consist of rubberized fabric, link, chain structure, leather or any other suitable material or structure known in the art.

In order to allow for the depression of the belt 3 between the rollers 5—5 as best shown in Figure 7, the lower roller 6 is vertically shiftable so as to be displaced upwardly from the position indicated in Figure 6 to that indicated in Figure 7. Preferably the ends of the shaft extend into slots 10 in a pair of opposite bearing plates 11—11 in order to allow vertical displacement of said shaft 12. Upon the ends of shaft 12 are first fixed pinions 13 and exteriorly thereof are loosely mounted bearing blocks 14 against each of which a compression spring 15 acts to depress said shaft and through roller 6 tends to keep the drive belt 3 under tension.

Above shaft 12 and roller 6 is rotatably mounted in plates 11—11 a propulsion shaft 16 having pinions 17 fixed upon the end portions thereof and also exteriorly loosely mounted bearing blocks 18 which confine the upper end in each case of the compression spring 15.

When a vehicle is in position with a rear wheel 8 in position upon the belt (Figure 7) the additional length of the belt required between rollers 5—5 to form the downwardly curved length or portion 9 will be taken up from the lower pendant portion of the same belt which automatically displaces shaft 12 and its roller 6, and particularly pinions 13 upwardly until they mesh with pinions 17. As particularly indicated in Figure 1, the shaft 16 may have a conventional middle paddle wheel 19 fixed thereon within the central open space 20 of the pontoon, so that when wheel 8 rotates the belt 3 will be driven down around rollers and cause rotation of the latter as well as its pinions 13 and thereby pinions 17 and shaft 16 and also paddle wheel 19, thus propelling the pontoon.

As shown in Figure 2, the paddle wheel between the drives may be replaced by a pair of exterior paddle wheels 21—21 at the sides if desired, or as indicated in Figure 3 gearing 22 and 23 may connect shaft 16 with a propeller shaft 24 having a propeller 25 exteriorly mounted thereon at the rear of the pontoon so that this propeller operates instead of paddle wheels.

In order to guide the rear portion of an automobile or truck and tend to retain the same properly centered upon the drives during operation a pair of opposite idler rollers 25 are swingably mounted upon brackets 26—26 at the sides of the rear portion of the pontoon in order to take simultaneously against the rear exterior portions of the hind wheels of the vehicle upon the pontoon, these brackets being capable of being set or adjusted by conventional means not shown to any position against a portion of the hind wheels irrespective of the width of the vehicle involved.

Figure 8:
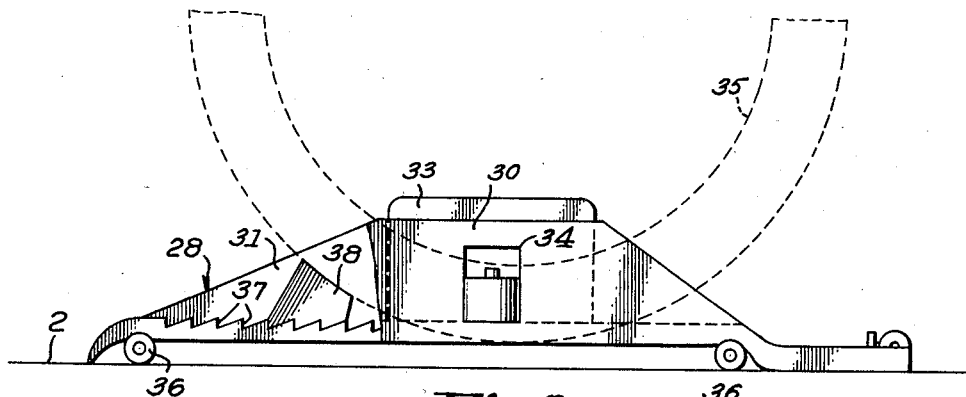
Fig. 8 is a side view of the front wheel rest shown in Figure 1 at the upper left, and also as seen from the left in said figure with a portion torn away to disclose detail.

It is evident that a pontoon or any other craft which is driven through the water should have means for guiding or steering, the same and such steering is now intended to be performed by steering the vehicle itself as though it were running upon land, the steering movements of the front wheels of said vehicle being transmitted to a rudder 27, which is pivoted at 28 in the interior of the pontoon. While the drive belts 3—3 have both been made wide enough to accommodate the different widths of wheel bases, a pair of front wheel rests generally indicated at 28—28 are provided with a floor 29 and sides 30—31. The front wheel of the vehicle is intended to rest upon the floor 29 while through the side 30 extends the shank 32 of a wheel plate 33 through a slot 34, the wheel being indicated by broken lines at 35 in Figure 8. Each front wheel rest is provided with a group of casters 36—36 which may be mounted for rotation not only upon horizontal axis but for swivelling about a vertical axis so that these wheel rests may be shifted in any direction upon deck 2 to correspond to the various lengths and widths of vehicle wheel bases. In order to fix the wheel properly in position so that no rolling tendency remains, the floor 29 of the wheel rest may in each case have a series of ratchet teeth 37 along the end portions with loose blocks 38 merely lying upon the ratchet teeth and themselves provided with corresponding teeth upon the bottom so that they will not be likely to slip off the wheel rest once they have been wedged into position under a wheel. In order to adjust the wheel rests 28 with plates 33—33 against the lower portions of the sides of the vehicle wheels, the shanks 32 of said plates are provided with a pair of adjusting bars 39—40 which are pivoted to said shank and at their outer ends are wedge shaped so as to engage in the ratchet teeth 42—42 of the rack structure 43—44 secured upon the deck of the pontoon. If these bars are adjusted by drawing the outer ends toward each other, the plate 33 will in each case be adjusted toward the center of the pontoon and thus it is possible to adjust both plates in this fashion to wedge the front wheels of a vehicle between said plates so that the vehicle is held against any tendency to sidewise movement or displacement.

However, in view of the fact that the bars 39 and 40 are pivoted to the shank 32 the pivot point 44 will serve as a pivot about which the whole wheel rest 28 may in each case swivel according to the movements of the front wheels effected by steering the same from the steering wheel of said vehicle. These steering movements are transmitted to the rudder 27 at the rear of the pontoon by means of cords, chains 45 or the like which are secured at 46 upon the rear ends of the wheel rests 28. The cord is passed over a pulley 47 at each side and preferably caused to run down below deck 2 through a thimble 48 at each side and at the rear end of the pontoon pass around pulleys 49—49 and have both ends secured to the lugs 50—51 upon the rudder 27. Whatever slack may exist in the chain or cord 45 is allowed to remain at 52 between the wheel rests 28—28, said slack taking no active part in the steering of the pontoon, but merely remaining between the wheel rests as available adjusting length to compensate for changes in the positions of the wheel rests to correspond to the various sizes and lengths of the vehicles borne upon the pontoon. It is thus quite clear that swivelling the front wheels by steering toward the right will cause both wheel rests to pivot about their pivot points 44 in the same direction, swinging the rear ends 46—46 toward the left and thereby swing rudder 27 sufficiently to steer the pontoon in corresponding manner.

When the wheel rests are to be temporarily dismantled they may be released by releasing the cord 45 at the rear ends 46 and drawing both rests in toward the center of the pontoon and dropping the same into a recess or well 53.

In order to enhance the utility of the pontoon and to increase its operation even under enemy fire during war time a plurality of metal doors 54, 55, 56 and 57 are hinged in any known or conventional manner to the upper edges of the pontoon so as to be swingable down into a substantially horizontal position upon the deck 2. The double purpose of these doors is first to form a protecting shield about the vehicle and the driver upon the pontoon by said doors being held in substantially vertical position as shown in Figures 1 through 5, and when said pontoon has been driven to the desired point the end door 54 may be laid down on the shore or next adjacent pontoon to form a gangplank for disembarking the vehicle after which all of the doors may be swung in upon the deck to lie upon the same and form a very durable and firm flooring over which to drive heavy artillery, etc., upon the bridge. the rear takeup rollers 25 and brackets 26 may be removed or swung out through apertures in doors 56 and 57, and in fact other means altogether may be used for retaining the rear drive wheels of the vehicle centered while recesses or receiving wells for such means may be swung into the rear portions of the deck 2 so that the protecting doors may lie flat upon the deck.

It is self-evident that if the drives 4—4 are enlarged to form a single drive and correspondingly lengthened, the same may serve to accommodate a tank and appropriate steering gear may be used other than that described.

Figure 9:
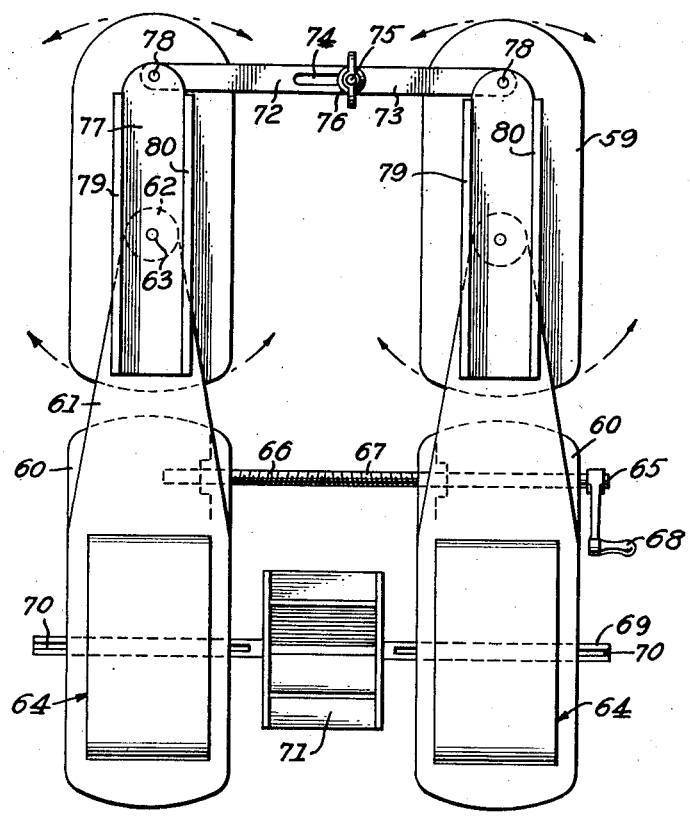
Fig. 9 is a top plan view of a pair of connection water skates equipped with drive means as well as steering means according to the invention.

It is equally evident that as shown in Figure 9, the pontoon may be replaced by a pair of connected water skis generally indicated at 58, each of which actually consists of a pair of smaller pontoons 59-60, the rear pontoon 60 having a forwardly extending plate 61 thereon provided with a pivot bearing 62 for pivoting the forward pontoon at pivot 63 so that said pontoon 59 can swivel upon said pivot. In order to drive said water skis 58, a drive means 64 similar to drive means 4 is mounted upon each of the rear ski members 60—60, while a two-way feed screw 65 with a right and left hand thread 66—67 passes through the walls of the rear pontoons 60—60 so as to adjust the same toward or from the other by operating the crank 68, while the drive shaft 69 is keyed to the drives 64, as for example, by key-ways 70—70 and slidable through said drives. Upon this shaft 69 is fixed a paddle wheel 71 between the skis, while a corresponding adjusting means is mounted upon the forward pontoons. This adjustment consists of two link members 72—73, the first having a slot 74, while a bolt or screw 75 extends through said front from link 73 and is adjusted by a swing nut 76.

Upon the forward ski members 59—59 is in each case mounted a front wheel support 77, to the front ends of which are pivoted the ends of link 72 and 73 at 78—78, while the side walls 79—80 confine the wheels of the vehicle between them so that swivelling of the wheels by steering will cause immediate and corresponding swivelling of the front pontoons 59—59 about their pivots 63 in the same direction.

While each of the forms of invention thus far described involves a vehicle of rectangular wheel base, it is quite evident that a single water ski could be used with or without riggers and with equipment for receiving a motorcycle and having appropriate side walls or supports, etc., for balancing the motorcycle while in operating position so that the rear wheel thereof can operate a drive similar to drive 64 in Figure 9.

While the foregoing description for the most part considers the use of the invention in war time, it is manifest that a single pontoon can be used as a self-propelled ferry in peace time for receiving a fully loaded truck and crossing a stream, and thereafter allowing the truck to proceed upon the other bank to its destination in order to avoid loss of time and expense entailed in loading and unloading the stock upon the trucks to boats and from boats to trucks, trains, etc. A self-propelled pontoon can, of course, travel up or down stream to a certain extent as well.

When viewing the invention from a proper perspective, it is naturally obvious that variations in detail and structure, and modifications within the scope of the appended claims are possible, and I, therefore, do not care to be limited strictly to the exact forms shown as they are merely presented by way of practical examples to guide in comprehending the invention and its advantages. It is thus clear that I am entitled to use equivalent parts to those specifically described, and hence, when using chains instead of belts as already intimated, the rollers or pulleys may then take the form of sprockets suitable for the chains used.

Having now fully described the invention and indicated how it may best be used, I claim:

1. A vehicle driven pontoon and the like including the combination, with pontoon means having steering means for steering the same through water and propulsion means in contact with the water, of normally disengaged drive means for said propulsion means having exposed portions disposed upon the deck of said pontoon means in a position adapting the same to be engaged and driven by a rear drive wheel of a self-propelled vehicle when in place upon said pontoon, said drive means having automatically operated portions responsive the presence of said rear drive wheel on said exposed portions thereof for automatically connecting the drive means with the propulsion means.

2. A vehicle driven pontoon and the like including the combination, with pontoon means having steering means for steering the same through water and propulsion means in contact with the water, of normally disengaged drive means for said propulsion means having exposed portions disposed upon the deck of said pontoon means in a position adapting the same to be engaged and driven by a rear drive wheel of a self-propelled vehicle when in place upon said pontoon, said drive means having an endless drive belt, a pair of roller means upon the deck of the pontoon means for supporting said drive belt at about the level of said deck, a propulsion shaft mounted on said pontoon means connected to the propulsion means, driving means in contact with said drive belt, and disengageable connecting means for automatically communicating the movement of the drive belt through said driven means to said propulsion shaft when the rear drive wheel of the vehicle rests in driving position upon said belt and said pair of roller means.

3. A vehicle driven pontoon and the like according to claim 1, having an endless drive belt, a pair of roller means upon the deck of the pontoon means for supporting said drive belt at about the level of said deck, a propulsion shaft mounted on said pontoon means connected to the propulsion means, propulsion gearing on said shaft, a shiftable roller mounted upon the pontoon means within said drive belt, corresponding gearing rigidly associated with said shiftable roller and resilient means acting on the shiftable roller to shift the same away from the pair of roller means so as to tense the belt, said shiftable roller being shifted by said belt to a position in which the gearing associated therewith meshes with the propulsion gearing when the rear drive wheel of the vehicle rests in driving position upon said belt and said pair of roller means.

4. A vehicle driven pontoon and the like according to claim 1, having fold down doors hinged to the edges of the pontoon means and capable of lying inwardly upon the deck in one position and of standing upright in effective position to shield the vehicle upon the pontoon means from enemy gunfire.

5. A vehicle driven pontoon and the like according to claim 1, having a pair of drive means, each being provided with a drive belt and pairs of roller means for supporting portions of the drive belts at substantially the level of the deck, driven means in contact with said drive belts, a propulsion shaft mounted on said pontoon means connected to the propulsion means, and disengageable connecting means forming at least part of the automatically operated portions for automatically communicating the movement of the drive belts to said propulsion shaft when the rear drive wheels of the vehicle rest in driving position on said belts and roller means.

6. A vehicle driven pontoon and the like according to claim 1, having a pair of drive means, each being provided with a drive belt and pairs of roller means for supporting portions of the drive belts at substantially the level of the deck, driven means in contact with said drive belts, a pair of front wheel supports movable upon the pontoon deck and each capable of receiving a front wheel of the vehicle and of moving with said wheel through steering movements, including upon each wheel support a pair of spaced walls adapted to receive a front wheel between the same, a movable wheel engaging plate within one of said walls having a projection extending through a slot in the latter wall, a pair of bars pivotally connected to said projection, and rack means having ratchet teeth fixed upon the pontoon deck in positions adapting them for engagement with said bars, and means including cord or chain means connected to portions of said front wheel supports and to the steering means in order to control the latter by steering the front wheels of said vehicle.

7. A vehicle driven pontoon and the like including the combination, with pontoon means having steering means for steering the same through water and propulsion means in contact with the water, of drive means for said propulsion means having exposed portions disposed upon the deck of said pontoon means in a position adapting the same to be engaged and driven by a rear drive wheel of a self-propelled vehicle when in place upon said pontoon, the drive means having an endless drive belt, a pair of roller means upon the deck of the pontoon means for supporting said drive belt at about the level of said deck, a propulsion shaft mounted on said pontoon means connected to the propulsion means, said pontoon means including two pontoon members, one fore and one aft, and both directly pivoted together to form an articulated unit, the drive means being located on the rear member, and means upon the forward member for accommodating a front wheel of the vehicle and allowing the front member to swivel to correspond to the steering movements of said front wheel.

8. A vehicle driven pontoon and the like including the combination, with pontoon means having steering means for steering the same through water and propulsion means in contact with the water, of drive means for said propulsion means having exposed portions disposed upon the deck of said pontoon means in a position adapting the same to be engaged and driven by a rear drive wheel of a self-propelled vehicle when in place upon said pontoon, the drive means having an endless drive belt, a pair of roller means upon the deck of the pontoon means for supporting said drive belt at about the level of said deck, a propulsion shaft mounted on said pontoon means connected to the propulsion means, said pontoon means including two pontoon means connected directly and adjustably together so as to form an adjustable pair, each consisting of a front pontoon and a rear pontoon directly pivotally connected together to form an articulated unit, the drive means being disposed in the rear pontoons, the front pontoons having means for receiving the front wheels of the vehicle and allowing said front pontoons to swivel with the steering movements of said wheels, and means for adjusting the distance between the articulated pontoon unit on one side from the articulated pontoon unit on the other side.

GIOVANNI FROVA.